United States Patent
Lehtinen et al.

(10) Patent No.: US 9,538,376 B2
(45) Date of Patent: Jan. 3, 2017

(54) AUTHENTICATING DATA COMMUNICATIONS

(71) Applicant: SSH Communications Security OYJ, Helsinki (FI)

(72) Inventors: Sami Juhani Lehtinen, Espoo (FI); Tero Tapani Mononen, Espoo (FI); Toni Kaarlo Tapio Tammisalo, Helsinki (FI)

(73) Assignee: SSH COMMUNICATIONS SECURITY OYJ, Helsinki (FI)

( * ) Notice: Subject to any disclaimer, the term of this patent is extended or adjusted under 35 U.S.C. 154(b) by 0 days.

(21) Appl. No.: 14/580,308

(22) Filed: Dec. 23, 2014

(65) Prior Publication Data

US 2016/0183087 A1 Jun. 23, 2016

(51) Int. Cl.
*G06F 7/04* (2006.01)
*G06F 15/16* (2006.01)
*G06F 17/30* (2006.01)
*H04L 29/06* (2006.01)
*H04W 12/06* (2009.01)

(52) U.S. Cl.
CPC .......... *H04W 12/06* (2013.01); *H04L 63/0281* (2013.01); *H04L 63/08* (2013.01); *H04L 63/0823* (2013.01); *H04L 63/0884* (2013.01); *H04L 63/306* (2013.01); *H04L 63/06* (2013.01); *H04L 63/166* (2013.01)

(58) Field of Classification Search
CPC .......... H04L 63/08; H04L 63/10; H04L 63/04; H04W 12/06; H04W 12/08
USPC .......................................................... 726/3
See application file for complete search history.

(56) References Cited

U.S. PATENT DOCUMENTS

| | | | |
|---|---|---|---|
| 7,275,102 B2 * | 9/2007 | Yeager | G06F 9/544 709/205 |
| 8,856,910 B1 | 10/2014 | Rostami-Hesarsorkh et al. | |
| 2004/0015725 A1 | 1/2004 | Boneh et al. | |
| 2005/0086300 A1 * | 4/2005 | Yeager | G06F 9/544 709/204 |
| 2005/0138426 A1 | 6/2005 | Styslinger | |
| 2007/0033643 A1 * | 2/2007 | Rossi | H04L 63/08 726/10 |
| 2012/0297043 A1 | 11/2012 | Davis et al. | |

(Continued)

OTHER PUBLICATIONS

BalaBit IT, "PCI Compliance and Forensics in Auditing Remote Server Access", Third Edition, Published Nov. 26, 2010, Balabit IT Security , p. 1-23.

(Continued)

*Primary Examiner* — Stephen Sanders
(74) *Attorney, Agent, or Firm* — Robert P. Michal, Esq.; Carter, DeLuca, Farrell & Schmidt, LLP

(57) ABSTRACT

Methods and apparatuses for authenticating data communications are disclosed. In a method an intermediate node between a sender device and a receiver device obtains an authenticator associated with the sender device. The intermediate node authenticates the sender device such that the intermediate node acts as the receiver device towards the sender device. The intermediate node is then authenticated to the receiver device such that the intermediate node uses the authenticator associated with the sender device for the authentication to transparently intervene data communications from the sender device to the receiver device.

18 Claims, 2 Drawing Sheets

(56) References Cited

U.S. PATENT DOCUMENTS

2013/0191627 A1    7/2013  Ylonen et al.
2014/0317409 A1   10/2014  Bartok et al.
2015/0030313 A1    1/2015  Tammisalo et al.

OTHER PUBLICATIONS

Balabit IT, "The Evolution of the Firewall", Version 1.0, dated Jun. 26, 2006, Balabit IT Security, pp. 1-11.
BalaBit IT, "SSH Proxying and 4-Eyes Authorization", Version 1.2, dated May 12, 2006, BalaBit IT Security, pp. 1-9.
BalaBit IT, "Proxying Secure Channels—the Secure Socket Layer", Verison 1.0, dated Jun. 7, 2006, pp. 1-12.
Office Action issued in U.S. Appl. No. 13/749,005 dated Oct. 21, 2015 (10 pages).
BalaBit IT Security, "Balabit Shell Control Box 2.0.2 Administrator Guide", 4th Edition, dated Apr. 9, 2010, Balabit IT Security, pp. 1-243.
Search Report issued by the United Kingdom Patent Office in relation to GB Application No. 1522380.3 dated Aug. 15, 2016 (5 pages).

\* cited by examiner

AUTHENTICATING DATA COMMUNICATIONS

FIELD OF THE INVENTION

This disclosure relates to data communications in a computerized system, and more particularly to authentication of data communications where an intermediate node can intervene communications between a sender and a receiver.

BACKGROUND

Communications in a computerised network are intervened for various reasons. Intervention can be used to create data e.g. for defensive, analytical and audit purposes and/or for preventing loss of data. For example, organizations such as businesses, governmental or municipal organizations or non-profitable organizations may wish to audit and/or otherwise monitor use and access to their internal computer systems. A network system and communications therein can be constantly monitored to protect the system from attacks by external users and data leaks and other unauthorised data communications and/or to prevent data loss. A way to provide this is to capture and analyse data communicated between two parties by an appropriate intermediate node. For example, an arrangement known as man in the middle (MIT) can be provided for capturing data.

A problematic situation may occur because where the communicating parties need to be authenticated. Authentication is a security measure commonly used for verifying the other party. For example, in public key authentication two asymmetric mathematically linked keys are required. One of the keys is a secret or private key and the other key is a public key wherein the private key is used to create a digital signature and the public key is used to verify the digital signature. Public key authentication cannot be transparently relayed by a data capturing node as the challenge signed with the private key of the sender contains information on the initial key exchange session, and more particularly the identifier of the session (Session ID). The Session ID can be unique for each key exchange session and therefore cannot be reproduced, even if the private key of the target entity of the connection, for example a server host, is known. In key exchange information from both endpoints of the key exchange negotiations is mixed in when the Session ID is created. More particularly, the session ID is based on a random nonse. They key-exchange can be based on e.g. a Diffie-Hellman exchange. In systems where key managers are used the key manager provides each host device with its own set of asymmetric keys.

A problem may occur because when the communications are routed through an intermediate node such as a node for capturing audit data or the like the authentication between the intermediate node and the receiver device a different session ID will appear in the challenge.

It is noted that the above discussed issues are not limited to any particular communication protocol and data processing apparatus but may occur in any system where authenticators are used and where an intermediate node can interfere with the authentication procedure between sender and receiver of data.

Embodiments of the invention aim to address one or several of the above issues.

SUMMARY

In accordance with an aspect there is provided a method for authenticating data communications, the method comprising obtaining at an intermediate node between a sender device and a receiver device an authenticator associated with the sender device, authenticating the sender device at the intermediate node, wherein the intermediate node acts as the receiver device towards the sender device, and authenticating the intermediate node to the receiver device, wherein the intermediate node uses the authenticator associated with the sender device for the authentication to transparently intervene data communications from the sender device to the receiver device.

In accordance with an aspect there is provided a method for providing an authenticator for data communications in an arrangement where an intermediate node is located between a sender device and a receiver device, the method comprising sending to the intermediate node an authenticator used by the sender device for authentication, the authenticator being send for use by the intermediate node in authentication of the intermediate node to the receiver device to enable transparent intervening by the intermediate node of data communications from the sender device to the receiver device.

In accordance with an aspect there is provided an apparatus for a data system, the apparatus comprising at least one processor, and at least one memory including computer program code, wherein the at least one memory and the computer program code are configured, with the at least one processor, to cause the apparatus to receive an authenticator associated with a sender device, the authenticator being indented for a receiver device, authenticate the sender device, wherein the apparatus is configured to act as the receiver device towards the sender device, and authenticate the apparatus to the receiver device, wherein the apparatus is configured to use the authenticator associated with the sender device for the authentication so that the apparatus can transparently intervene data communications from the sender device to the receiver device.

In accordance with an aspect there is provided an apparatus for managing authenticators for data communications, the apparatus comprising at least one processor, and at least one memory including computer program code, wherein the at least one memory and the computer program code are configured, with the at least one processor, to cause the apparatus to send to an intermediate node an authenticator used by a sender device for authentication, wherein the authenticator is send for use by the intermediate node in authentication of the intermediate node to a receiver device to enable transparent intervening by the intermediate node of data communications from the sender device to the receiver device.

In accordance with an aspect there is provided a non-transitory computer readable media comprising program code for causing a processor to perform instructions for obtaining at an intermediate node between a sender device and a receiver device an authenticator associated with the sender device, authenticating the sender device at the intermediate node when the intermediate node acts as the receiver device towards the sender device, and authenticating the intermediate node to the receiver device by using the authenticator associated with the sender device for the authentication to enable transparent intervention in data communications from the sender device to the receiver device.

In accordance with a yet further aspect there is provided a non-transitory computer readable media comprising program code for causing a processor to perform instructions for sending to an intermediate node between a sender device and a receiver device an authenticator used by the sender device for authentication, wherein the authenticator is send to the intermediate node for use by the intermediate node in authentication of the intermediate node to the receiver device to enable transparent intervening by the intermediate node of data communications from the sender device to the receiver device.

In accordance with a more detailed aspect there the authenticator comprises a private key of the sender device. Public key authentication between the intermediate node and the receiver device can be provided using the private key of the sender device provided for the intermediate device. The intermediate node may use the private key of the sender device for signing a challenge comprising a session identity for authentication to the receiver device.

The authenticator may be provided for the intermediate node by a key management server. The authenticator can be stored by the intermediate node in a memory in its control.

The sender device may comprises a client device. The receiver device may comprise a server. The intermediate node may comprise at least a portion of data auditor apparatus.

Certain more detailed aspects are evident from the detailed description.

SUMMARY OF DRAWINGS

Various exemplifying embodiments of the invention are illustrated by the attached drawings. Steps and elements may be reordered, omitted, and combined to form new embodiments, and any step indicated as performed may be caused to be performed by another device or module. In the figures

DETAILED DESCRIPTION

Figure 1:
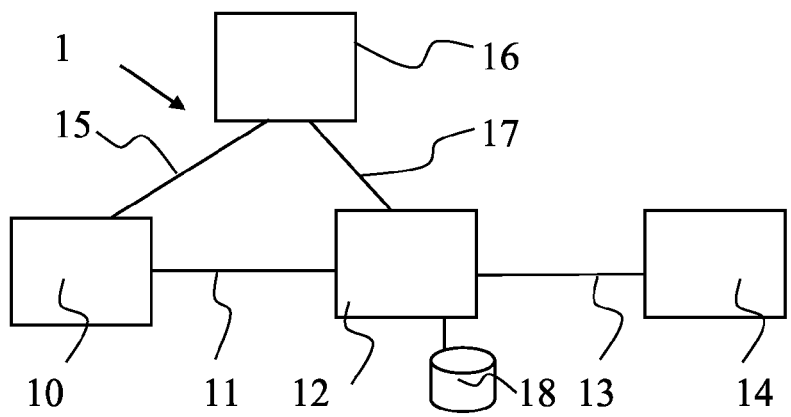
FIG. 1 illustrates an example of a data network setup where the invention can be embodied.

FIG. 1 shows an example of a data network system 1 where the herein described principles may be embodied. The data network can be for example an Intranet of an enterprise or another organisation. The network can be e.g. an IPv4 or IPv6 based network. In this example a sender of the data comprises a client host 10 and the receiver of the data comprises a server 14. The client host 10 is shown to have a communication connection via links 11 and 13 with the server 14.

Communication session between the devices flows through an intermediate node or data capturing device 12. The intermediate node 12 hosts a data capturing entity configured to monitor traffic going there through and capture data for e.g. data audit purposes. The captured data may be processed and/or stored at the intermediate node, forwarded to another entity for processing or processed otherwise. Operation of the intermediate node and how the data is processed is of lesser relevance in here as such. What is important is that data is communicated between the client device 10 and the server device 14 via the intermediate node 12.

The links 11 and 13 can be provided via fixed line connection. It is possible that at least a part of the connection is provided over a wireless interface. For example, the client device may be provided wireless access to the communication network. A wireless connection to the network can be provided via a base station based on e.g., wireless local area network (WLAN), GSM/EDGE/HSPA, 3G, 4G, 5G, or WiMAX standards, and/or optical and near-field networks, or any future development of wireless standards. The links may comprise one of more data networks. Alternatively, at least one of the links is provided within the same network as the intermediate node 12 and at least one of the sender device 10 and receiver device 14.

At least a part of data flowing through the intermediate node can be encrypted. In such case the intermediate data processing device can be configured to provide a man-in-the-middle (MITM) type operation on the encrypted data flowing there through to obtain the plaintext of the data. The MITM operation involves decryption of encrypted data. This can be based on knowledge of the private key used in the encryption. The data capturing intermediate node 12 is operated and maintained by a trusted party, typically the owner of the network, and can thus be provided with the necessary keys and/or other security information required for the decryption.

It is noted that this is only an example and that the shown architecture and/or MITM type operation is not necessary in all scenarios. For example, the monitored passing data flow can also be plaintext, for example plaintext transport control protocol (TCP) communications. Instead of the shown arrangement other network arrangements and modes are also possible. For example, interfaces 11 and 13 can be in a bastion mode.

A data capture entity can be provided as a standalone hardware component or embedded in another element, e.g. in a firewall or the like component. The data capture entity can also be provided as a virtual machine set up in cloud computing environment. A firewall may contain one or more protocol proxies, such as an secure shell (SSH) proxy, remote desktop protocol (RDP) proxy, virtual network computing (VNC) proxy, file transfer protocol/secure (FTP/S; FTP over Secure Sockets Layer (SSL), Transport Layer Security (TLS) protocols) proxy, or HTTP/S (HTTP over SSL/TLS) proxy. A proxy may also implement more than one protocol. Each proxy can contain a man-in-the-middle component for performing man-in-the-middle operation, or key escrow or other suitable method, for obtaining access to the plaintext of the session.

In FIG. 1 the intermediate node and the sender device are shown to be connected to a separate authenticator management entity 16. In case of the authenticators comprise keys, for example public and private key pairs, the management entity can be provided by a key manager server for centralised management of keys. For example, a universal key manager server may be provided. A key manager generates, distributes and manages keys for devices and applications of a data network system. In FIG. 1 key manager 16 can manage keys for devices 10 and 12 through interfaces 15 and 17, respectively. For example, the key manager can create keys and provide each host in the system with a set of asymmetric keys.

Figure 2:
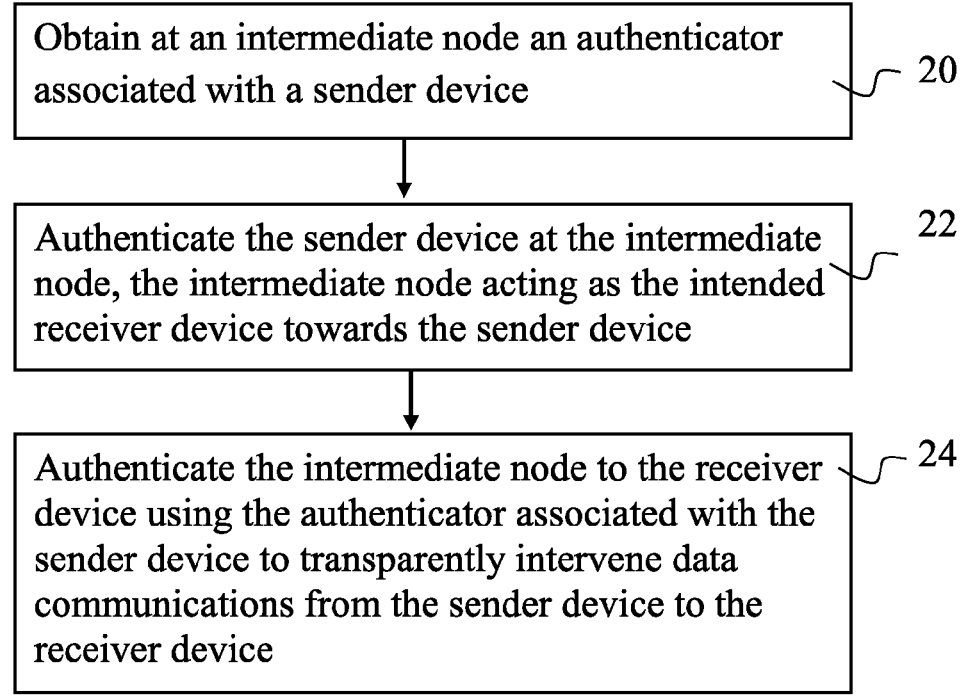
FIGS. 2 and 3 show flowcharts in accordance with certain embodiments.

In accordance with embodiment shown in the flowchart of FIG. 2 data communications from a sender device to a receiver device where there is an intermediate node between the devices is authenticated transparently for the devices based on an authenticator associated with the sender device. In the method an intermediate node between the sender device and the receiver device obtains at 20 the authenticator associated with the sender device. The sender device is authenticated at the intermediate node at 22 such that the intermediate node acts as if it were the receiver device towards the sender device. The intermediate node is then authenticated to the receiver device at 24. At this stage the intermediate node uses the authenticator associated with the sender device for the authentication to transparently intervene data communications from the sender device to the receiver device. Thus the receiver device does not see a difference to an authentication exchange with the sender device but believes to be in correspondence with the actual sender.

Figure 3:
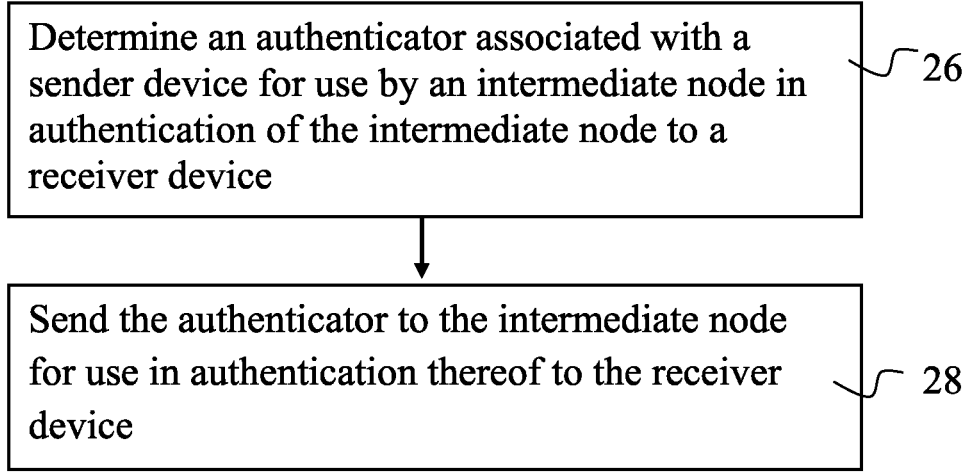

FIG. 3 shows the operation at an authenticator manager. In the shown method for authenticating data communications where an intermediate node is located between a sender device and a receiver device, an authenticator associated with the sender device is determined at 26 for sending to the intermediate node. The authenticator associated with the sender device is communicated at 28 to the intermediate node for use by the intermediate node in authentication of the intermediate node to the receiver device to enable transparent intervening by the intermediate node of data communications from the sender device to the receiver device.

The authenticator can comprise a private key of the sender device for performing public key authentication between the intermediate node and the receiver device. The intermediate node can use the private key for signing a challenge comprising a session identity.

In accordance with a more specific example the intermediate node 12 provides a data capturer for an audit arrangement. Auditing data traffic in the system can be desired for various reasons. For example, a company policy may force all data traffic, or traffic form particular hosts to be audited. It may even be necessary to set up a key manager to work through the auditor nodes for network topology reasons. An auditor node may only transparently support password and keyboard interactive authentications. All challenges and responses can be sent through an unencrypted channel in clear text and therefore can be relayed transparently through the auditor node. If encryption of the content is used, the auditor node would need to be provided with a clear text password.

Public key based authentication cannot be transparently relayed by the intermediate node to the receiver device as the challenge signed by the private key of the sender device by the sender device contains information on the initial key exchange. Since a session ID that is unique for each key exchange is provided the session ID cannot be reproduced if different private keys are used for different "legs" of communications between the sender and receiver devices. To address this the key manager 16 sends the private key of the sender device 10 to the intermediate auditor entity 12 to be registered for use in authentication.

During discovery phase the connections from the key manager to hosts can be performed using password authentication. The key manager creates a management key pair and registers the private key of the sender device at the auditor device with information about the target host. Each host can have a unique management key pair, and this information is needed to associate the correct key pair with the host as otherwise the capturer, or "hound", would need to try all private keys in the private key store. The registration of information can be done by running a management command on the auditor node. Other ways of associating the key are also possible. For example, it is possible to just use a stored private key with the same public key as used in authenticating to the capturer from the original client (e.g. an UKM server). If the latter association method is used, user and server information do not need to be configured.

A capturer component of an auditing system can be classified to be a high security level device and thus this operation can be allowed through a policy. The private key of the sender device can then be used to authenticate the intermediate device to the target server using public key authentication with the registered private key.

The mapping information for different hosts and authenticators can be stored in a particular storage module connected to the intermediate node. This module is sometimes referred to as a vault. In FIG. 1 the storage module is denoted by reference 18.

In accordance with a possibility information can be inserted and updated in the storage module without going through a user interface configuration version mechanism. This can provide advantage in scalability although version information may be lost, depending on the application. This however is not considered to be a particular problem as the user information is not necessarily something that require versioning. The user groups and rules can still be versioned and individual users can be classified as being more dynamic in nature.

According to a possibility the registering of private keys is provided through user Interface configuration mechanism where a configuration is created for the capturer element. All public keys can be authorised for the user so that the capturer component is allowed to look into the administrative account. This form of operation may be less scalable than the arrangement where user information is stored in the storage module.

Figure 4:
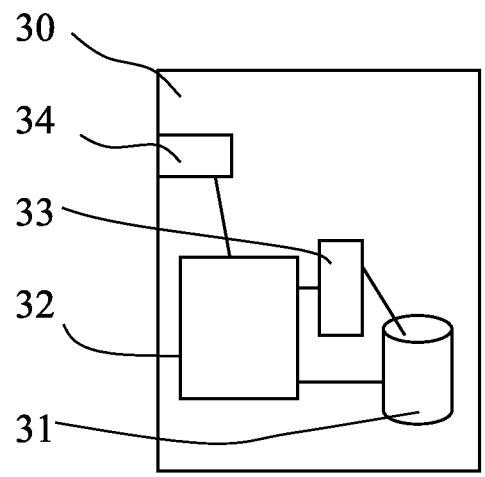
FIG. 4 shows data processing apparatus.

FIG. 4 shows an example of control apparatus for providing necessary data processing functions to implement the above described embodiments. The control apparatus 30 can be for example integrated with, coupled to and/or otherwise arranged for controlling the intermediate node 12 of FIG. 1 and/or the key manager device 16. The control apparatus 30 can be further arranged to provide control on the captured data and any additional information. The control apparatus 30 can be configured to provide control functions in association with operations such as authentications with the sender device and the receiver device, decryption of data, signalling and data communication operations. Likewise, at the key manager device a control apparatus can determine which key(s) or other authenticators need to be send to an intermediate node and control distribution thereof. For these purposes the control apparatus comprises at least one memory 31, at least one data processing unit 32, 33 and an input/output interface 34. Via the interface the control apparatus can be coupled to the transport entities of the respective device. The control apparatus can be configured to execute an appropriate software code to provide the control functions. The control apparatus can also be interconnected with other control entities.

The various embodiments and their combinations or subdivisions may be implemented as methods, apparatuses, or computer program products. Methods for downloading computer program code for performing the same may also be provided. Computer program products may be stored on non-transitory computer-readable media, such as memory chips, or memory blocks implemented within the processor, magnetic media such as hard disk or floppy disks, and optical media such as for example DVD and the data variants thereof, CD, magnetic disk, or semiconductor memory. Method steps may be implemented using instructions operable to cause a computer to perform the method steps using a processor and a memory. The instructions may be stored on any computer-readable media, such as memory or non-volatile storage.

The required data processing apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The above describes examples of where private keys can be transparently used by an intermediate node in authentication between a sender device and a receiver device. For example, in a client-server pair it would look for the server as if the client would be authenticating itself with its own private key to the server when in fact the client authenticates itself to the intermediate node and then the intermediate node uses the private key of the client provided therein for this use to connect to the server. Therefore two different sets of private keys are not used for authenticating communications between the client and the server while the auditing of the communications is transparent to the end host.

The foregoing description provides by way of exemplary and non-limiting examples a full and informative description of exemplary embodiments of the s invention. However, various modifications and adaptations may become apparent to those skilled in the relevant arts in view of the foregoing description, when read in conjunction with the accompanying drawings and the appended claims.

We claim:

1. A method for monitoring data communications, the method comprising:
    obtaining, at an intermediate node between a sender device and a receiver device, an authenticator associated with the sender device from a separate authenticator manager;
    authenticating the sender device at the intermediate node, wherein the intermediate node acts as the receiver device towards the sender device;
    authenticating the intermediate node to the receiver device, wherein the intermediate node uses the authenticator associated with the sender device for the authentication to transparently intervene data communications from the sender device to the receiver device; and
    monitoring, by the authenticated intermediate node, data communicated from the authenticated sender device to the receiver device.

2. The method according to claim 1, wherein the authenticator includes a private key of the sender device, and the method further comprises performing public key authentication between the intermediate node and the receiver device using the private key of the sender device.

3. The method according to claim 2, wherein the intermediate node uses the private key of the sender device for signing a challenge including a session identity for authentication to the receiver device.

4. The method according to claim 1, further comprising:
    receiving the authenticator at the intermediate node from a key management server; and
    storing the authenticator by the intermediate node.

5. The method according to claim 1, wherein the sender device includes a client device, the receiver device includes a server, and the intermediate node includes at least a portion of a data auditor apparatus.

6. A method for providing an authenticator for data communications in an arrangement where an intermediate node arranged to monitor data communications is located between a sender device and a receiver device, the method comprising sending, from an authenticator manager to the intermediate node, an authenticator used by the sender device for authentication, the authenticator being sent for use by the intermediate node in authentication of the intermediate node to the receiver device to enable transparent monitoring by the intermediate node of data communications from the sender device to the receiver device.

7. The method according to claim 6, wherein the authenticator includes a private key of the sender device for use in performing public key authentication between the intermediate node and the receiver device.

8. The method according to claim 6, wherein the sender device includes a client device, the receiver device includes a server, and the intermediate node includes at least a portion of a data auditor apparatus, and the method further comprises sending the authenticator from a key management server to the intermediate node.

9. An apparatus for a data monitoring system, the apparatus comprising at least one processor, and at least one memory including computer program code, wherein the at least one memory and the computer program code are configured, with the at least one processor, to cause the apparatus to:
    receive, from a separate authenticator manager, an authenticator associated with a sender device, the authenticator being intended for a receiver device;
    authenticate the sender device while acting as the receiver device towards the sender device;
    authenticate the apparatus to the receiver device using the authenticator associated with the sender device for the authentication so that the apparatus can transparently intervene data communications from the sender device to the receiver device; and
    monitor, when authenticated to the receiver device, data communicated from the authenticated sender device to the receiver device.

10. The apparatus according to claim 9, wherein the authenticator includes a private key of the sender device, the apparatus using the private key of the sender device in public key authentication between the apparatus and the receiver device.

11. The apparatus according to claim 10, wherein the at least one memory and the computer program code are further configured, with the at least one processor, to cause the apparatus to use the private key of the sender device for signing a challenge including a session identity for authentication to the receiver device.

12. The apparatus according to claim 9, wherein the at least one memory and the computer program code are further configured, with the at least one processor, to cause the apparatus to receive the authenticator from a key management server and store the received authenticator in a memory.

13. The apparatus according to claim 9, wherein the sender device includes a client device, the receiver device includes a server, and the apparatus includes at least a portion of a data auditor apparatus.

14. An apparatus for managing authenticators for data communications, the apparatus comprising at least one processor, and at least one memory including computer program code, wherein the at least one memory and the computer program code are configured, with the at least one processor, to cause the apparatus to send to an intermediate node arranged to monitor data communications an authenticator used by a sender device for authentication, wherein the authenticator is sent for use by the intermediate node in authentication of the intermediate node to a receiver device to enable transparent monitoring by the intermediate node of data communications from the sender device to the receiver device.

15. The apparatus according to claim 14, wherein the authenticator includes a private key of the sender device for use in performing, by the intermediate node, public key authentication between the intermediate node and the receiver device.

16. The apparatus according to claim 14, wherein the apparatus includes a key management server, the sender device includes a client device, the receiver device includes a server, and the intermediate node includes at least a portion of a data auditor apparatus.

17. A non-transitory computer readable media including program code for causing a processor to perform instructions for:
   obtaining, at an intermediate node between a sender device and a receiver device, from a separate authenticator manager, an authenticator associated with the sender device;
   authenticating the sender device at the intermediate node when the intermediate node acts as the receiver device towards the sender device;
   authenticating the intermediate node to the receiver device by using the authenticator associated with the sender device for the authentication to enable transparent intervention in data communications from the sender device to the receiver device; and
   monitoring, by the authenticated intermediate node, data communicated from the authenticated sender device to the receiver device.

18. A non-transitory computer readable media for an authenticator manager including program code for causing a processor to perform instructions for sending, to an intermediate node arranged to monitor data communications between a sender device and a receiver device, an authenticator used by the sender device for authentication, wherein the authenticator is sent to the intermediate node for use by the intermediate node in authentication of the intermediate node to the receiver device to enable transparent monitoring by the intermediate node of data communications from the sender device to the receiver device.

* * * * *